June 6, 1939.   R. MacHAYNES   2,161,480
AUTOMATIC CUTTING AND SLICING MACHINE
Filed April 22, 1938   3 Sheets-Sheet 1
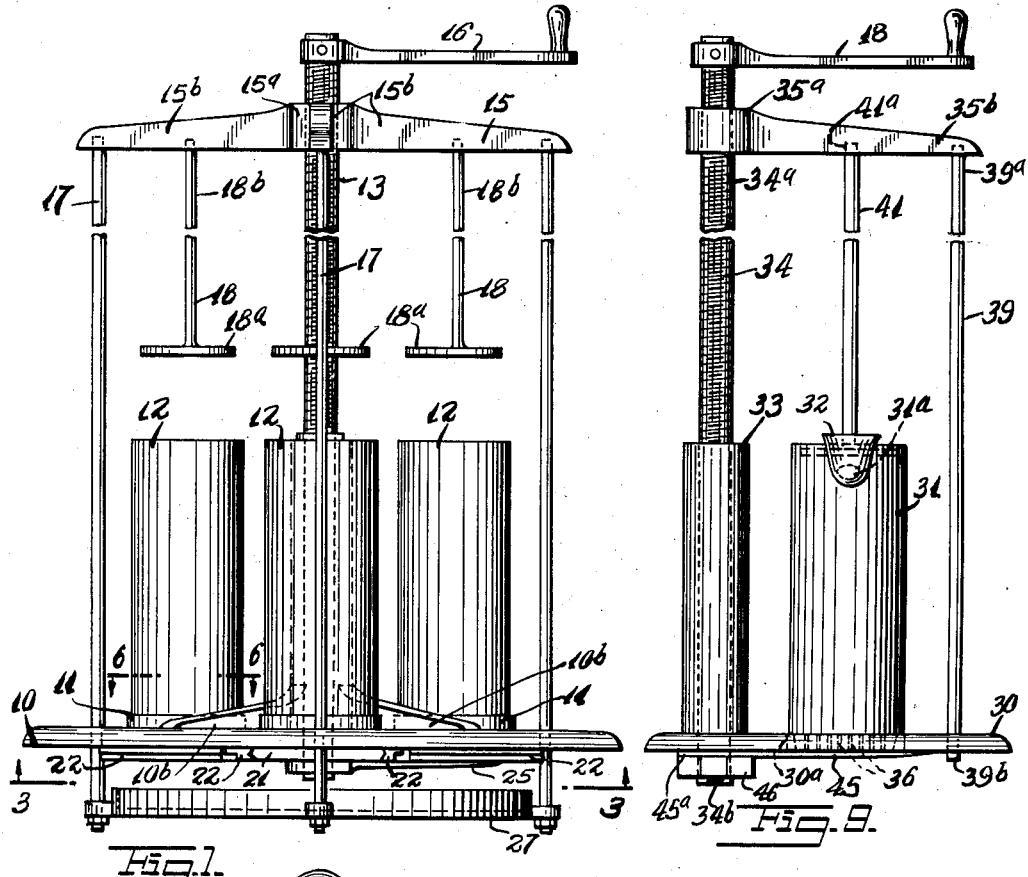
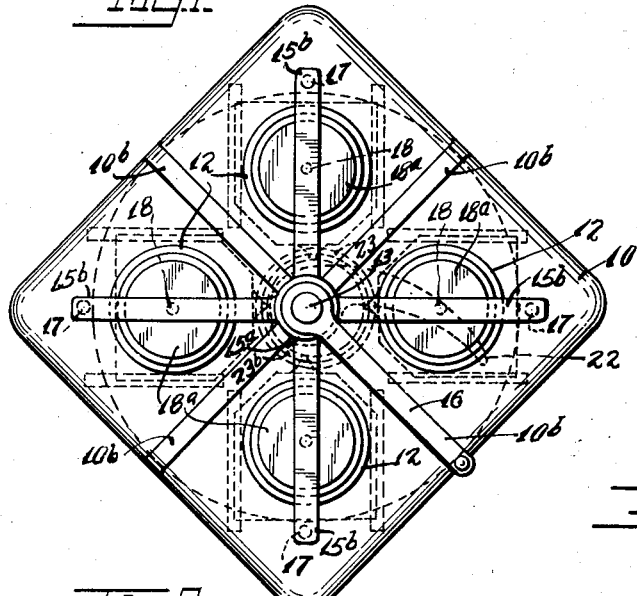
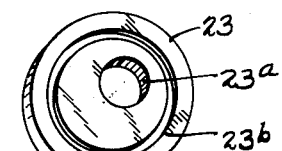
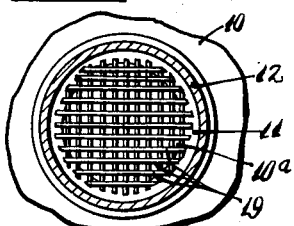
INVENTOR
*Raymond MacHaynes*
BY
ATTORNEY June 6, 1939. R. MacHAYNES 2,161,480
AUTOMATIC CUTTING AND SLICING MACHINE
Filed April 22, 1938 3 Sheets-Sheet 2
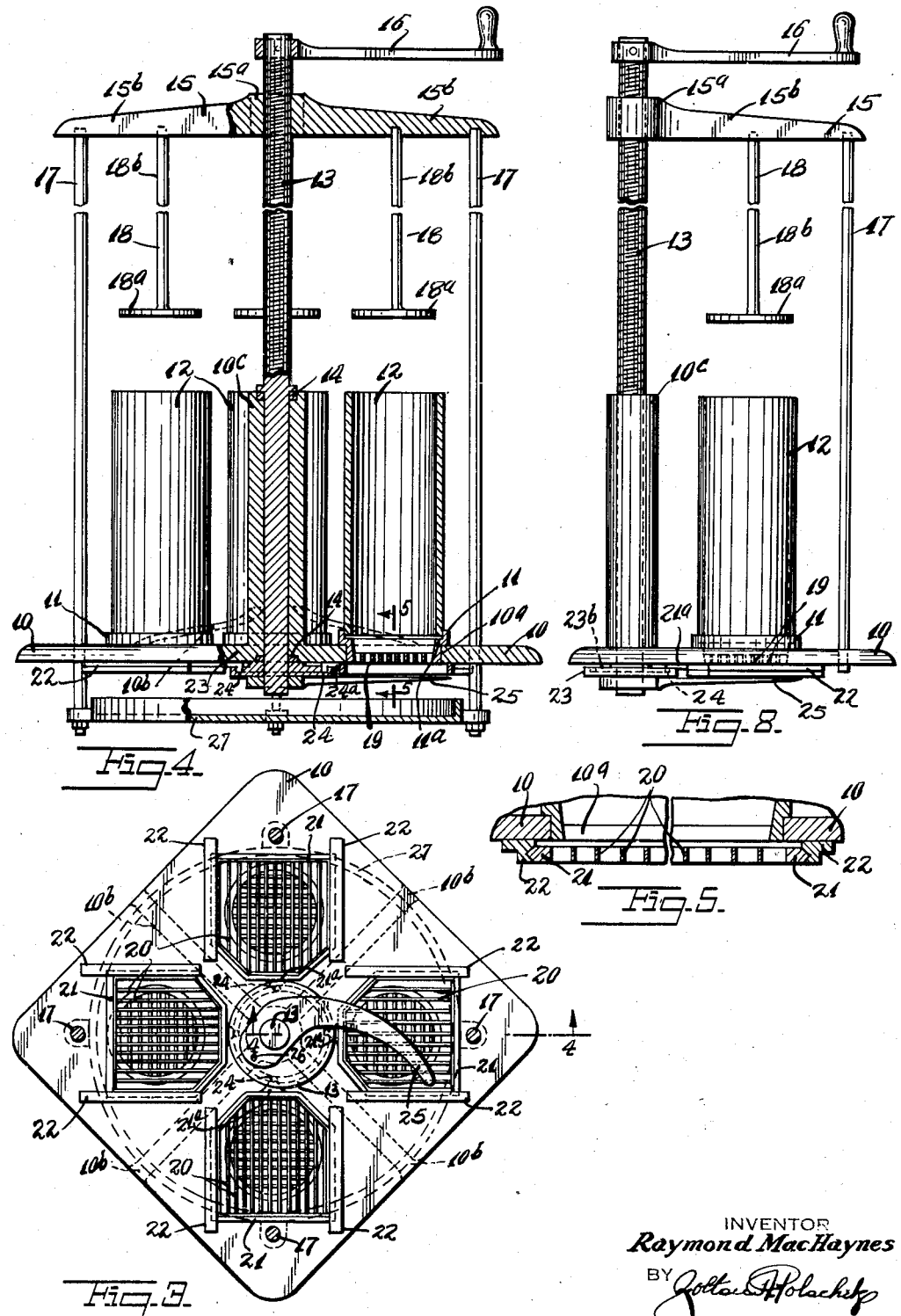
INVENTOR
Raymond MacHaynes
BY
ATTORNEY

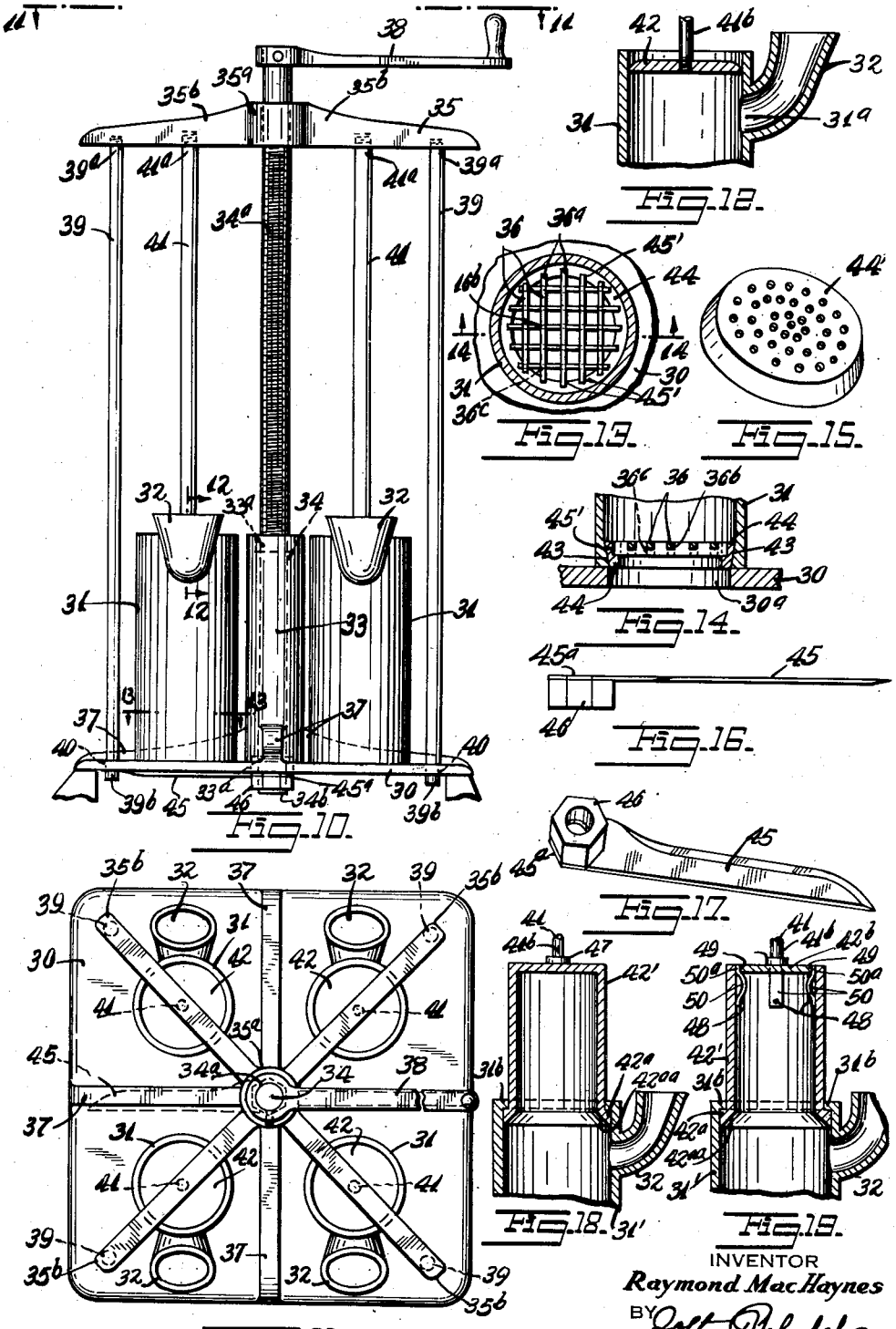

Patented June 6, 1939

2,161,480

UNITED STATES PATENT OFFICE 2,161,480

AUTOMATIC CUTTING AND SLICING MACHINE

Raymond MacHaynes, Bethpage, N. Y.

Application April 22, 1938, Serial No. 203,486

10 Claims. (Cl. 146—78)

This invention relates to new and useful improvements in an automatic cutting and slicing machine.

More specifically, the invention proposes the construction of an automatic cutting and slicing machine which may be used to dice, cube, or slice meat, or grind fruits and vegetables and which also may be used for making potato chips and French fried potatoes.

Still further the invention proposes the construction of an automatic cutting and slicing machine characterized by the provision of one or more elongated cylinders mounted upon a base member having openings communicating with the ends of said cylinders so that foods or materials placed into the cylinders may be forced against a plurality of knives mounted on the bottom of each of said cylinders for slicing said foods.

Still further it is proposed to so construct the device that it may be provided with any number of cylinders depending on the use to which the machine is to be put and the amount of work which is to be completed by the said device.

Still further it is proposed to characterize the blades by the provision of stationary blades mounted within the bottom end of the cylinder and with movable blades slidably supported in the frame at the bottom end of the cylinders and to arrange the blades at right angles to each other for slicing the said materials when forced against the blades.

Still further the invention proposes rotatively support a shaft in a vertical column extending from the base and to threadedly mount a follower against rotation so that when the shaft is rotated, the follower will move downwards thereon.

A further object of the invention is to support pressure discs upon the follower and which are engageable into the cylinders for moving the foods and materials placed therein towards the blades when the shaft is rotated.

A further object of this invention provides for fixedly mounting an eccentric disc upon a portion of said shaft and to attach the frames supporting the movable blades thereto for causing the said blades to oscillate with relation to the cylinders when the shaft is rotated.

A still further object of this invention is to provide a tray supported upon a portion of the rods which limit the rotation of the follower and which is adapted to move with the follower in the same direction for catching and holding the fruits and materials forced from between the blades.

Another object of this invention is to construct the knives so that none of them will be movable and rely entirely upon pressure for cutting the foods and materials placed within the cylinders.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is an elevational view of an automatic cutting and slicing machine constructed according to this invention.

Fig. 2 is a plan view of Fig. 1.

Fig. 3 is a view looking in the direction of the line 3—3 of Fig. 1.

Fig. 4 is a view similar to Fig. 1 but with a portion thereof in section.

Fig. 5 is a sectional view on the line 5—5 of Fig. 4.

Fig. 6 is a sectional view on the line 6—6 of Fig. 1.

Fig. 7 is a perspective view of the eccentric disc per se.

Fig. 8 is an elevational view of a modification of the invention.

Fig. 9 is a view similar to Fig. 8 illustrating a further modification of the invention.

Fig. 10 is a view similar to Fig. 1 illustrating a still further modification of the invention.

Fig. 11 is a plan view looking in the direction of the line 11—11 of Fig. 10.

Fig. 12 is a sectional view on the line 12—12 of Fig. 10.

Fig. 13 is a sectional view on the line 13—13 of Fig. 1.

Fig. 14 is a sectional view on the line 14—14 of Fig. 13.

Fig. 15 is a perspective view of the perforated disc which may be used in conjunction with this invention.

Fig. 16 is an edge elevational view of the bottom knife per se.

Fig. 17 is a bottom perspective view of the bottom knife.

Fig. 18 is a view similar to Fig. 12 but illustrating a modification of the invention.

Fig. 19 is another view similar to Fig. 12 but illustrating a still further modification.

The automatic cutting and slicing machine comprises a base 10 having openings 10ª. This base 10 is substantially flat and is provided with one or more openings 10ª and is integrally formed with reinforcing members 10ᵇ which extend across the face thereof and which are adapted to reinforce the same. A ring 11 is mounted in each of the openings 10ª and has its upper portion extending from the opening and has its bottom edge flush with the bottom face of the base 10.

A cylinder 12 for each of the openings 10ª is supported upon a portion of the ring 11. The ring 11 is formed with a shoulder 11ª upon which the bottom end of the cylinder 12 rests. The cylinder 12 has its bottom open end aligned with the openings 10ª formed in the base 10.

A screw member 13 is rotatively mounted on the base 10 and extends longitudinally of the cylinders 12. A hollow column 10ᶜ is formed integrally with the base 10ª and is formed at its ends with thrust bearings 14 which are adapted to rotatively support the screw member 13. This screw member 13 has its ends extending from the top and bottom of the column 10ᶜ.

A follower arm 15 is rotatively supported upon the upper extended portion of the screw member 13. This follower arm consists of a center portion 15ª which threadedly engages the upper portion of the screw member 13 and which is integrally formed with radially extending arms 15ᵇ. There is one arm 15ᵇ for each of the cylinders 12.

A means is provided for turning the screw member 13 and comprises a handle 16 fixedly attached to the upper extended portion of the screw member 13 above the follower 15. This handle 16 is adapted to be manually rotated for turning the screw element 13. A means is provided for movably holding the follower arm 15 to limit its turning and cause it to move longitudinally of the screw when the screw is turned. This means comprises rods 17 securely attached at their upper ends to the outer ends of the arms 15ᵇ and which extend at right angles to the arms 15ᵇ and which slidably engage into openings formed in the base 10. Thus these rods act to hold the follower arm 15 against rotating so that when the screw member 13 is rotated, the follower arm will move longitudinally of the screw member 13.

A pressure disc 18 for each cylinder is mounted on the follower arm 15 and is engageable into the top end of the cylinders. These pressure discs comprise flat disc portions 18ª which are engageable into the cylinders 12 and which are formed at their top face with upwardly extended finger portions 18ᵇ. The upper end of the finger portions 18ᵇ are securely attached to an intermediate portion of the arms 15ᵇ for engaging the pressure discs 18 into the cylinders 12 when the follower arm 15 moves longitudinally of the screw member 13. The discs 18ª are adapted to be superimposed above the top end of the cylinders 12 when the follower arm 15 is at the top of the screw member 13 to permit the food or materials to be sliced to be engaged into the cylinders 12. This is clearly shown in Figs. 1 and 4.

Stationary blades 19 are mounted across the openings 10ª in the base 10. These knives are arranged parallel to each other and have their ends engaged in slots formed in the inner edge portion of the rings 11. Thus these stationary knives 19 are supported directly upon the ring 11 at the bottom end of the cylinders 12 for slicing the material or foods forced towards the bottom of the cylinders by the pressure dics 18.

Movable blades 20 are radially slidable relative to the screw 13 and are mounted upon the bottom face of the base 10 and immediately adjacent the openings 10ª. These movable blades 20 are also arranged parallel to each other and at right angles to the stationary blades 19. These movable blades have their ends engaging in slots formed on the inner edge portions of frames 21 slidably supported upon the bottom face of the base 10. The sides of the frames 21 slidably engage track elements 22 securely attached to the bottom face of the base 10. The adjacent faces of the frame 21 and the track elements 22 are formed with inter-engaging portions for horizontally slidably supporting the frames thereon.

An eccentric disc 23 is securely attached to the bottom extended portion of the screw member 13 and is connected with the frames 21 of the movable blades 20 to reciprocate them as the screw member 13 is turned. This eccentric disc 23 comprises a circular disc having an opening 23ª arranged close to one edge portion thereof. The bottom end of the screw member 13 is adapted to be engaged into the openings 23ª. A cam cutout 23ᵇ is formed in the top face of the eccentric disc 23. The inner ends of the frames 21 are formed with inwardly extending lugs 21ª upon which rollers 24 are rotatively supported. These rollers 24 are adapted to engage into the cam cutouts 23ᵇ for moving the frames 21 back and forth radially of the screw member 13 when the screw member is turned.

A revolving blade 25 is fixedly attached to the bottom face of the eccentric disc 23 and traverses the compass immediately below the moving blades 20 for cutting the foods and materials which are passed through the blades 19 and 20 horizontally to the cuts formed by the latter-mentioned blades. Screws 26 extend through openings formed in the inner end of the revolving blade 25 and threadedly engage into the bottom face of the eccentric disc 23 for fixedly attaching the revolving blade thereto to cause the revolving blade to move therewith when the screw 13 is rotated.

A means is provided for catching the materials which pass through the openings 10ª in the disc and comprises a tray 27 which is securely attached to the bottom ends of the rods 17. This tray 27 is adapted to move with the rods 17 away from the bottom face of the base 10 to make additional room thereon for the said materials or foods as the screw member 13 is rotated.

The operation of this device is as follows:

The handle 16 is rotated in a direction for rotating the screw member 13 to move the follower arm 15 to the top end of the top extended portion of the screw member 13. This movement of the screw member 13 causes the pressure discs 18 to be disengaged from the top end of the cylinders 12 so that the foods or materials to be diced, cubed, sliced or ground may be engaged therein. The handle 16 is then rotated in the opposite direction for rotating the screw 13 to cause the follower arm 15 to move towards the cylinders 12. This movement of the follower arm also causes the pressure discs 18 to move towards the cylinders with the bottom face of the disc 18ª engaging against the top of the foods or materials. After the pressure discs have contacted the top of the foods further rotation of the handle 16 will cause the pressure discs to force the foods against the frames 19 and 20 mounted in the bottom end of the cylinders 12. When the materials are forced against the stationary blades 19, these blades will form vertical cuts along the length of the foods or materials, and after passing the stationary blades 19, the materials will contact the movable blades 20. As the screw is being rotated, the eccentric disc 23 is also rotating therewith to oscillate the frames 21 supporting the movable blades 20. As the frames 21 oscillate the movable blades 20 will form vertical cuts in the materials at right angles to the vertical cuts formed by the stationary blades 19. The oscillation of the frames 21 imparts a cutting movement to the movable blades 20 for assisting the same in cutting the said foods or materials. As the eccentric disc 23 rotates, the revolving blade 25 will move in a circular path along the bottom face of the frames 21 for forming horizontal cuts in the said foods or materials. After the foods have passed the revolving blade 25, they will drop upon the tray 27 which is supported at the bottom end of the rods 17. This tray 27 is adapted to move with the rods 17 away from the bottom face of the base 10 for catching and holding the foods and materials which have passed between the blades. After the pressure discs 18 have moved the full length of the cylinders 12, the handle 16 may again be rotated in the opposite direction for withdrawing the discs 18 from the cylinders 12 to permit more foods to be placed therein. The above procedure is repeated for cutting the materials which have just been placed within the cylinders 12.

According to the modification shown in Fig. 8, the slicing and cutting machine is very similar to the form shown previously except that there is only one cylinder 12 supported upon the base 10. Likewise, there is only one pressure disc 18. The other parts which are associated with this cylinder are similar to those shown in the previous form and like reference numerals are used for indicating similar parts.

According to the modification shown in Fig. 9, there is also one cylinder but there is no provision for movable blades and all of the blades are mounted within the bottom end of the cylinders.

The modification of the automatic cutting and slicing machine, according to Figs. 10 to 17, comprises a base 30 upon which a plurality of elongated cylinders 31 are mounted and which communicate at their bottom ends with openings 30ª formed in the base 30. At their top ends the cylinders 11 are formed with openings 32 into which the food or material may be passed. A hollow column 33 extends upwards from the center of the base 30. A shaft 34 is rotatively supported in the column and has a portion 34ª extending from the top of the column 33. A follower 35 is threadedly supported upon the extended portion 34ª of the shaft 34 and a means is provided for rotating the shaft 34.

A plurality of knives 36 are mounted in the bottom end of each of said cylinders, and a means is provided for limiting the follower 35 against rotation when the shaft 34 is rotated so that the follower 35 will move downwards thereon. A means is mounted on the follower and extends into each of said cylinders and is movable downwards with the follower for urging the food or material to be sliced from the hopper end of said cylinders towards the knife and thereof for slicing the same as it passes between the knives 36.

The base 30 is a substantially flat piece of metal and has the column 33 integrally formed therewith. A plurality of ribs 37 extend from the base of the column 13 to the edge of the base 10 for reinforcing the connection between the column 33 and the base 30. The cylinders 31 are securely attached at their bottom ends to the top face of the base 30 with their openings aligned with the openings 30ª formed in the base 30. At their top ends at the sides thereof the cylinders 31 are formed with openings 31ª which communicate with the bottom ends of the hoppers 32 so that the food or materials which are placed into the hoppers will pass into the cylinders 31.

The column 33 at its top and bottom ends is formed with bearings 33ª which rotatively support the shaft 34. At the top of the extended portions 34ª, the shaft 34 is formed with a handle 38 which forms the means for rotating this shaft. The follower 35 comprises a collar 35ª which threadedly engages the extended portions 34ª of the shaft 34. The collar 35ª is formed with a plurality of outwardly extending fingers 35ᵇ. The means for limiting the follower against rotating when the shaft 34 is rotated comprises a downwardly extending guide rod 39 which is securely attached at its top end 39ª to the outer end of the fingers 35ᵇ. The bottom end 39ᵇ of the guide rod 39 extends through an opening 40 formed in the corner of the base 10. There is one guide rod 19 for each of the fingers 35ª and when the shaft 34 is rotated, these guide rods act to limit the rotation of the follower 35 so that it will only be capable of moving downwards along the length of the extended portion 34ª of the shaft 34.

The means extendible into the cylinders 31 for moving the foods towards the knives 36 comprises a shaft 41 which is securely attached at its upper end 41ª to an intermediate portion of each of the fingers 35ᵇ. At its bottom end 41ᵇ the shaft 41 is formed with a disc shaped piston 42 having a circumference equal to the circumference of the opening in the cylinder 31, and when the follower 35 moves downwards, the disc shaped piston 42 will move downwards within the cylinder 31 for urging the food or materials placed into the cylinder against the knives 36.

At the bottom ends the cylinders 31 are formed with inwardly extending edges 43 which are adapted to receive an annular ring 44 which has a corresponding inwardly extending outer edge. The annular ring 44 is formed on its inner edges with a plurality of slots 45' into which the ends 36ª of the knives 36 are releasably supported so that the knives may be removed therefrom for cleaning. The knives are arranged in crisscross formation. The knives 36 which run in one direction are formed with slots 36ᵇ extending half way through the width of the knife, and the knives 36 which extend in the other direction are formed with slots 36ᶜ which extend half way through the width of these knives so that the knives 36 will be able to cross each other in substantially the same plane.

The annular ring 44 is removably mounted within the bottom face of the cylinder and may be removed and replaced by the perforated disc 44' shown in Fig. 15. This perforated disc may be used when it is desired to squeeze juices from fruits, etc.

The bottom end 34ᵇ of the shaft 34 extends from the bottom face of the base 30 and is provided with a knife 45 which is adapted to rotate with the shaft 34 for cutting the material pressed through the knives 36 after the knives 36 have sliced the same. This knife 45 is formed at its inner end with an enlarged portion 45ª which is securely attached to one of the faces of a nut 46 which is engageable upon the end 34ᵇ of the shaft.

The operation of this device is as follows:—

The handle 38 is rotated to move the follower 35 upwards so that the disc shaped pistons 42 will be located at the top of the cylinders 31. Then the food to be sliced and cut is placed into the cylinders 31 through the hoppers 32 and the handle 38 is again rotated to move the follower 35 downwards on the extended portion 34ª of the shaft 34. As this handle is rotated, the follower 35 will move the disc shaped pistons 42 downward into the cylinders 31 to urge the food or material against the knives 36 for slicing the same as it passes between the knives 36. As the shaft 34 rotates, it will also cause the knife 45 to rotate around the bottom of the base 30 for cutting the material sliced by the knives 36 into short pieces. After the disc shaped piston 42 reaches the bottom of the cylinder 31, the handle 38 is again rotated in the opposite direction to move the follower 35 upwards which will correspondingly move the pistons 42 so that more food or material may be placed into the cylinders 31.

According to the modification shown in Fig. 18 the cylinders 31' are formed with the hoppers 32 in the same manner as described relative to the previous form of the invention, but the piston is shaped slightly different. Instead of being disc shaped, the piston 42' is cup-shaped and is formed at its bottom edge with an outwardly extending flange 42ª which is adapted to abut a complementary inwardly extending flange 31ᵇ formed at the top of the cylinder 31' for preventing this cup shaped piston 42' from being withdrawn from the top end of the cylinder 31'. The bottom of the inwardly extending flange 42ª is formed with a chamfered edge 42ᵃᵃ over which the food or material placed into the cylinder 31' is adapted to slide for urging the said foods or materials into the cup-shaped piston 42'. At it stop end the cup-shaped piston 42' is formed with a boss 47 to which the bottom end 41ᵇ of the shaft 41 is securely attached. In other respects this form of the invention is similar to the previous form.

According to the modification shown in Fig. 19, the top wall 42ᵇ of the cup-shaped piston 42' is releasably held in position by means of a plurality of upwardly extending leaf springs 50. The bottom ends of the leaf springs 50 are securely attached to the inside wall of the cup-shaped piston 42' by means of a pin 48. The upper end 50ª of the leaf spring 50 extends into cut-outs 49 formed in the edges of the top wall 42ᵇ. This top wall 42ᵇ is formed with a boss 47' to which the bottom end 41ᵇ of the shaft 41 is securely attached. Thus when the bottom edge of the cup-shaped piston 42' contacts the annular ring 44 mounted within the bottom of the cylinder 31', further rotations of the handle 38 will cause the follower 35 to move the top wall 42ᵇ out of its normal position with relation to the leaf springs 50 so that this top wall 42ᵇ will move downwards within the cup-shaped piston 42' to force that portion of the material which was engaged into the cup-shaped piston 42' through the knives 36. In other respects, this form of the invention is similar to the form described relative to Fig. 18.

It is to be understood that this device may be operated by the handle 38 or by any suitable motor drive, to operate a plurality of feeding and cutting units of any suitable size and proportion for feeding, cutting or slicing the food product in container 31. The knives 36 may be made of piano wires for cutting of fruits and vegetables.

While I have described and illustrated the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. An automatic cutting and slicing machine, comprising a base with openings, a cylinder mounted on each opening, a screw member rotatively mounted on said base and extending longitudinally of said cylinders, a follower arm threadedly engaging said screw, means for turning said screw, means for movably holding said follower arm to limit its turning and causing it to move longitudinally of said screw when the screw is turned, a pressure disc for each cylinder and mounted on said follower arm and engageable into the tops of said cylinder, stationary blades mounted across said openings in the base, movable blades radially slidable relative to said screw member and mounted beneath said base and immediately adjacent said openings, an eccentric disc mounted on said screw member and connected with said movable blades to reciprocate them as the screw member turns, and a revolving blade mounted on said screw member and transversing the compass immediately below said moving blades.

2. An automatic cutting and slicing machine, comprising a base with openings, a cylinder mounted on each opening, a screw member rotatively mounted on said base and extending longitudinally of said cylinders, a follower arm threadedly engaging said screw, means for turning said screw, means for movably holding said follower arm to limit its turning and causing it to move longitudinally of said screw when the screw is turned, a pressure disc for each cylinder and mounted on said follower arm and engageable into the tops of said cylinder, stationary blades mounted across said openings in the base, movable blades radially slidable relative to said screw member and mounted beneath said base and immediately adjacent said openings, an eccentric disc mounted on said screw member and connected with said moveable blades to reciprocate them as the screw member turns, and a revolving blade mounted on said screw member and transversing the compass immediately below said moving blades, and an annular ring mounted in each of said openings formed in said base and having its bottom edge flush with the bottom face of said base and its top portion extending from the top face of said base, and each ring being formed with an inner shoulder upon which the bottom ends of said cylinders are rested.

3. An automatic cutting and slicing machine, comprising a base with openings, a cylinder mounted on each opening, a screw member rotatively mounted on said base and extending longitudinally of said cylinders, a follower arm threadedly engaging said screw, means for turning said screw, means for movably holding said follower arm to limit its turning and causing it to move longitudinally of said screw when the screw is turned, a pressure disc for each cylinder and mounted on said follower arm and engageable into the tops of said cylinder, stationary blades mounted across said openings in the base, movable blades radially slidable relative to said screw member and mounted beneath said base and immediately adjacent said openings, an eccentric disc mounted on said screw member and connected with said movable blades to reciprocate them as the screw member turns, and a revolving blade mounted on said screw member and transversing the compass immediately below said moving blades, said means for movably holding said vertical arm to limit its turning comprising rods attached to portions of said follower arm and extending downwards longitudinally of said screw member and slidably passing through openings formed in said base, and a tray supported on the bottom end of said rods and movable with said rods for catching the foods or materials which have passed through said blades.

4. An automatic cutting and slicing machine, comprising a base with openings, a cylinder mounted on each opening, a screw member rotatively mounted on said base and extending longitudinally of said cylinders, a follower arm threadedly engaging said screw, means for turning said screw, means for movably holding said follower arm to limit its turning and causing it to move longitudinally of said screw when the screw is turned, a pressure disc for each cylinder and mounted on said follower arm and engageable into the tops of said cylinder, stationary blades mounted across said openings in the base, movable blades radially slidable relative to said screw member and mounted beneath said base and immediately adjacent said openings, an eccentric disc mounted on said screw member and connected with said movable blades to reciprocate them as the screw member turns, and a revolving blade mounted on said screw member and transversing the compass immediately below said moving blades, and an annular ring mounted in each of said openings formed in said base and having its bottom edge flush with the bottom face of said base and its top portion extending from the top face of said base, and each ring being formed with an inner shoulder upon which the bottom ends of said cylinders are rested, said stationary blades being arranged parallel to each other and having their ends engaging slots formed in the inner face of said annular ring.

5. An automatic cutting and slicing machine, comprising a base with openings, a cylinder mounted on each opening, a screw member rotatively mounted on said base and extending longitudinally of said cylinders, a follower arm threadedly engaging said screw, means for turning said screw, means for movably holding said follower arm to limit its turning and causing it to move longitudinally of said screw when the screw is turned, a pressure disc for each cylinder and mounted on said follower arm and engageable into the tops of said cylinder, stationary blades mounted across said openings in the base, movable blades radially slidable relative to said screw member and mounted beneath said base and immediately adjacent said openings, an eccentric disc mounted on said screw member and connected with said movable blades to reciprocate them as the screw member turns, and a revolving blade mounted on said screw member and transversing the compass immediately below said moving blades, and an annular ring mounted in each of said openings formed in said base and having its bottom edge flush with the bottom face of said base and its top portion extending from the top face of said base, and each ring being formed with an inner shoulder upon which the bottom ends of said cylinders are rested, said stationary blades being arranged parallel to each other and having their ends engaging slots formed in the inner face of said annular ring, said movable blades being arranged parallel to each other and at right angles to said stationary blades, frames slidably supported on the bottom face of said disc, and said movable blades having their ends engaging slots formed on the inner face of said frames, and means for connecting said frames to said eccentric disc.

6. An automatic cutting and slicing machine, comprising a base with openings, a cylinder mounted on each opening, a screw member rotatively mounted on said base and extending longitudinally of said cylinders, a follower arm threadedly engaging said screw, means for turning said screw, means for movably holding said follower arm to limit its turning and causing it to move longitudinally of said screw when the screw is turned, a pressure disc for each cylinder and mounted on said follower arm and engageable into the tops of said cylinder, stationary blades mounted across said openings in the base, movable blades radially slidable relative to said screw member and mounted beneath said base and immediately adjacent said openings, an eccentric disc mounted on said screw member and connected with said movable blades to reciprocate them as the screw member turns, and a revolving blade mounted on said screw member and transversing the compass immediately below said moving blades, and an annular ring mounted in each of said openings formed in said base and having its bottom edge flush with the bottom face of said base and its top portion extending from the top face of said base, and each ring being formed with an inner shoulder upon which the bottom ends of said cylinders are rested, said stationary blades being arranged parallel to each other and having their ends engaging slots formed in the inner face of said annular ring, said movable blades being arranged parallel to each other and at right angles to said stationary blades, frames slidably supported on the bottom face of said disc, and said movable blades having their ends engaging slots formed on the inner face of said frames, and means for connecting said frames to said eccentric disc, said means comprising inwardly extending lugs formed on said frames, rollers rotatively supported on said lugs, and said rollers being engageable into cam cutouts formed in the top face of said eccentric disc for reciprocating said frames when said eccentric disc rotates.

7. An automatic cutting and slicing machine, comprising a base with openings, a cylinder mounted on each opening, a screw member rotatively mounted on said base and extending longitudinally of said cylinders, a follower arm threadedly engaging said screw, means for turning said screw, means for movably holding said follower arm to limit its turning and causing it to move longitudinally of said screw when the screw is turned, a pressure disc for each cylinder and mounted on said follower arm and engageable into the tops of said cylinder, stationary blades mounted across said openings in the base, movable blades radially slidable relative to said screw member and mounted beneath said base and immediately adjacent said openings, an eccentric disc mounted on said screw member and connected with said movable blades to reciprocate them as the screw member turns, and a revolving blade mounted on said screw member and transversing the compass immediately below said moving blades, said screw member being rotatively supported within an upwardly extending hollow column formed integrally with said base, and said screw member having said follower arm mounted on the top end thereof and said eccentric disc mounted on the bottom end thereof.

8. An automatic cutting and slicing machine, comprising a base with openings, a cylinder mounted on each opening, a screw member rotatively mounted on said base and extending longitudinally of said cylinders, a follower arm threadedly engaging said screw, means for turning said screw, means for movably holding said follower arm to limit its turning and causing it to move longitudinally of said screw when the screw is turned, a pressure disc for each cylinder and mounted on said follower arm and engageable into the tops of said cylinder, stationary blades mounted across said openings in the base, movable blades radially slidable relative to said screw member and mounted beneath said base and immediately adjacent said openings, an eccentric disc mounted on said screw member and connected with said movable blades to reciprocate them as the screw member turns, and a revolving blade mounted on said screw member and transversing the compass immediately below said moving blades, said screw being rotatable for moving said follower arm to disengage said pressure discs from the top end of said cylinders so that said foods or materials to be diced, cubed, sliced or ground may be engaged into said cylinder from the top thereof.

9. An automatic cutting and slicing machine, comprising a base, a plurality of elongated cylinders on said base and communicating with openings in said base at their bottom ends and having hopper openings at their top ends, a hollow column extending upward from the center of said base, a shaft rotatively supported in said column and having a portion extending from the top of said column, a follower threadedly supported on the extended portion of said shaft, means for rotating said shaft, a plurality of knives mounted in the hollow end of said cylinder, a means for limiting said follower against rotating when said shaft is rotated so that said follower will move downward thereon, and means on said follower extending into said cylinders and movable downwards with said follower, whereby material to be sliced may be placed into said cylinders through said hoppers and said shaft rotated to urge said materials against said knives for slicing the same, said follower comprising a collar threadedly engaging the extended portion of said shaft, and a plurality of outwardly extending fingers attached to said collar, one for each of said cylinders, said means for urging said materials against said knives comprising a downwardly extending shaft attached at its upper end to an intermediate portion on said fingers, and a member mounted on the bottom end of said shaft and having a circumference equal to the circumference of the opening in said cylinder, said member comprising a cup-shaped piston, means for releasably supporting the top wall of said cup-shaped piston so that when the bottom edge of said cup-shaped piston reaches said knives further rotations of said handle will cause said top wall to move downwards within said cup-shaped piston.

10. An automatic cutting and slicing machine, comprising a base, a plurality of elongated cylinders on said bottom ends and having hopper openings at their top ends, a hollow column extending upward from the center of said base, a shaft rotatively supported in said column and having a portion extending from the top of said column, a follower threadedly supported on the extended portion of said shaft, means for rotating said shaft, a plurality of knives mounted in the hollow end of said cylinder, a means for limiting said follower against rotating when said shaft is rotated so that said follower will move downward thereon, and means on said follower extending into said cylinders and movable downwards with said follower, whereby material to be sliced may be placed into said cylinders through said hoppers and said shaft rotated to urge said materials against said knives for slicing the same, said follower comprising a collar threadedly engaging the extended portion of said shaft, and a plurality of outwardly extending fingers attached to said collar, one for each of said cylinders, said means for urging said materials against said knives comprising a downwardly extending shaft attached at its upper end to an intermediate portion on said fingers, and a member mounted on the bottom end of said shaft and having a circumference equal to the circumference of the opening in said cylinder, said member comprising a cup-shaped piston, means for releasably supporting the top wall of said cup-shaped piston so that when the bottom edge of said cup-shaped piston reaches said knives further rotations of said handle will cause said top wall to move downwards within said cup-shaped piston, said means comprising leaf springs having one of their ends attached to the inner walls of said cylinders and having the other of their ends extending upwards and engaging cutouts formed in the periphery of said top wall for holding said top wall in position until said cup-shaped piston is fully extended into said cylinder.

RAYMOND MacHAYNES.